US012428902B2

(12) United States Patent
Adams et al.

(10) Patent No.: US 12,428,902 B2
(45) Date of Patent: Sep. 30, 2025

(54) ENCAPSULATED OVEN WINDOW PACK

(71) Applicant: GEMTRON CORPORATION, Sweetwater, TN (US)

(72) Inventors: Brian Adams, Vincennes, IN (US); Michael Schwall, Knoxville, TN (US)

(73) Assignee: GEMTRON CORPORATION, Sweetwater, TN (US)

( * ) Notice: Subject to any disclaimer, the term of this patent is extended or adjusted under 35 U.S.C. 154(b) by 494 days.

(21) Appl. No.: 17/098,876

(22) Filed: Nov. 16, 2020

(65) Prior Publication Data

US 2022/0154523 A1 May 19, 2022

(51) Int. Cl.

| | |
|---|---|
| ***E06B 3/66*** | (2006.01) |
| ***E06B 3/20*** | (2006.01) |
| ***F24C 15/04*** | (2006.01) |
| *E06B 3/663* | (2006.01) |
| *E06B 3/673* | (2006.01) |

(52) U.S. Cl.

CPC ............ *E06B 3/6625* (2013.01); *E06B 3/205* (2013.01); *F24C 15/04* (2013.01); *E05Y 2900/308* (2013.01); *E06B 3/66* (2013.01); *E06B 3/6617* (2013.01); *E06B 3/66328* (2013.01); *E06B 3/66347* (2013.01); *E06B 3/673* (2013.01)

(58) Field of Classification Search

CPC ..... E05Y 2900/308; E06B 3/205; E06B 3/66; E06B 3/6617; E06B 3/6625; E06B 3/66328; E06B 3/66347; E06B 3/6673; E06B 3/6621; F24C 15/04

USPC .......................................................... 126/200

See application file for complete search history.

(56) References Cited

U.S. PATENT DOCUMENTS

| | | | |
|---|---|---|---|
| 2,306,327 | A | 12/1942 | Baldwin |
| 2,733,789 | A | 2/1956 | Tolle |
| 3,791,910 | A | 2/1974 | Bowser |
| 3,872,198 | A | 3/1975 | Britton |
| 4,205,104 | A | 5/1980 | Chenel |
| 4,393,105 | A | 7/1983 | Kreisman |
| 4,622,249 | A | 11/1986 | Bowser |
| 4,822,649 | A | 4/1989 | Canaud |
| 4,951,927 | A | 8/1990 | Johnston |

(Continued)

FOREIGN PATENT DOCUMENTS

| | | | |
|---|---|---|---|
| DE | 102004002470 A1 * | 8/2005 | ....... B29C 45/14434 |
| EP | 2011399 | 1/2009 | |
| EP | 2159489 | 3/2010 | |

OTHER PUBLICATIONS

DE-102004002470-A1—Translation (Year: 2005).*

*Primary Examiner* — Steven B McAllister
*Assistant Examiner* — Benjamin W Johnson
(74) *Attorney, Agent, or Firm* — MARSHALL, GERSTEIN & BORUN LLP

(57) ABSTRACT

The present disclosure provides a glass assembly having a plastic frame and two glass panes in spaced parallel arrangement, wherein at least one of the glass panes is encapsulated within the plastic frame. The glass assembly is part of a door that is connected to an oven to allow selective access to the interior oven cavity. The encapsulated glass pane can face the interior oven cavity, or face away from the interior oven cavity, toward the environment outside the oven. Each glass pane can also be encapsulated within a frame half, and the two frame halves can be connected to one another. The disclosure also provides a method of making the glass assembly.

19 Claims, 10 Drawing Sheets

(56) References Cited

U.S. PATENT DOCUMENTS

| | | | | |
|---|---|---|---|---|
| 5,061,531 | A | 10/1991 | Catalano | |
| 5,789,724 | A * | 8/1998 | Lerssen | H05B 6/766 174/382 |
| 6,216,417 | B1 | 4/2001 | Morin | |
| 6,228,290 | B1 | 5/2001 | Reames | |
| 10,196,851 | B2 | 2/2019 | Bienick | |
| 2001/0023560 | A1 | 9/2001 | Degelsegger | |
| 2003/0072899 | A1 * | 4/2003 | Compton | E06B 3/66328 428/34 |
| 2005/0034486 | A1 * | 2/2005 | Bienick | F24C 15/04 68/3 R |
| 2014/0322461 | A1 | 10/2014 | Freidl | |
| 2015/0107575 | A1 * | 4/2015 | Plevacova | C03C 3/087 126/200 |
| 2016/0222717 | A1 * | 8/2016 | Bienick | E06B 3/66309 |

* cited by examiner

ENCAPSULATED OVEN WINDOW PACK

BACKGROUND OF THE DISCLOSURE

1. Field of the Disclosure

The present disclosure relates to insulated glass assemblies for use in oven doors and other applications such as medical cabinets or sterilization machines. More particularly, the present disclosure relates to oven door assemblies that have at least one glass pane encapsulated in plastic.

2. Background of the Disclosure

Currently available window assemblies for commercial and residential oven doors are very costly, as they have many components that are required to be assembled to produce the combined window and door assembly. Insulated glass units (IGUs) used as oven window assemblies for oven doors often require many insulating seals, and in some cases layers of insulating seals, to properly insulate the interior of the oven cavity. In addition, current IGUs for oven windows are typically made of glass and metal, and the metal often conducts oven cavity heat to other components of the oven and the exterior environment. In addition, it is difficult to completely seal and insulate assemblies having many interconnected parts.

Referring to FIG. 1, one such prior art oven door assembly is shown. As can be seen, there are many components that are part of an oven door assembly. In particular, gasket 318 provides an insulting barrier between glass panes 338 and door frame 340, and is often deemed essential to prevent heated air and moisture leakage. Current assemblies can fail when the gasket dries out and cracks or ruptures.

SUMMARY OF THE DISCLOSURE

The assemblies of the present disclosure alleviate many of the problems of current assemblies. The assemblies of the present disclosure can use injection molding and can create one singular part that holds the glass by encapsulation. The encapsulation process can provide correct spacing between the panes of glass to achieve desired thermal performance and to eliminate the need for various insulating seals used in conventional assemblies. The encapsulated oven window assemblies of the present disclosure can be drop-in and fully complete assemblies that only need to be mounted to an oven door frame to provide the final combined oven window and door assembly.

Certain types of plastics (e.g. resins and polymers) provide better thermal insulation as compared to metal, so heat transfer across the assemblies of the present disclosure can be minimized if not eliminated through the selection of the plastic used as the encapsulating material. The complicated and lengthy assembly of conventional assemblies can also be eliminated, as a single-piece molded frame can replace most or all of the traditionally needed parts. An encapsulation process, such as injection-molding, allows for the encapsulating material to be applied directly on the glass, thus making it much less likely that insulating seals (such as gaskets) will be needed between the frame that holds the glass pane and the glass itself. However, since both glass panes may not be encapsulated, and since the encapsulation may not provide a completely air-tight seal with the glass, gas between the glass panes can "breathe" to a certain extent by entering and escaping from between the glass panes. This reduces the likelihood of explosive failures due to pressure changes caused by changing the altitude of the assembly or heating the air between the glass panes. Stated another way, the assemblies of the present disclosure greatly reduce or eliminate conductive heat transfer across the assembly. A small amount of convective heat transfer may take place because the assemblies are not necessarily completely airtight, but any lack of airtightness is an improvement over current assemblies and is acceptable because of the above-benefits provided by the ability for air or gas inside the assembly to equalize with the outside environment. The assemblies of the present disclosure also allow for modular variants where various types of glass and plastic can be used depending on the intended application.

The present disclosure achieves these goals with an assembly comprising at least two glass panes in spaced, substantially parallel arrangement. The assembly can be dropped into or connected to an oven door frame in a very quick and simple manner. At least one of the panes may be encapsulated with a resin or polymer material. The encapsulation material can be shaped for example into an L-shape or form having two flanges (see for example FIG. 3, discussed in greater detail below, with horizontal flange 2*a* and vertical flange 2*b* forming the L-shape) so that at least one encapsulated pane is encapsulated in one leg of the form and the non-encapsulated pane can be adhered to the remaining leg of the form in a way that the edge of the non-encapsulated pane is not visible from the exterior of the oven door. Alternatively, two panes of glass can each be encapsulated in resin or polymer material, and the two separate encapsulation forms can be adhered to one another before being placed in an oven door.

Thus, in one embodiment, the present disclosure provides an assembly, comprising a plastic frame, a first glass pane, and a second glass pane, wherein the first glass pane and the second glass pane are in substantially parallel, spaced arrangement. The first glass pane is encapsulated by the frame around a perimeter of the first glass pane. The second glass pane is not encapsulated by the frame.

In another embodiment, the present disclosure provides an assembly, comprising: a plastic frame, wherein the plastic frame comprises a first frame half and a second frame half; a first glass pane; and a second glass pane, wherein the first glass pane and the second glass pane are in substantially parallel, spaced arrangement. The first glass pane is encapsulated within the first frame half. The first frame half and the second frame half are connected to one another. The second glass pane may or may not be encapsulated by the second frame half.

The present disclosure also provides an oven comprising a glass assembly and an oven door, wherein the glass assembly is connected to the oven door, and a housing. The oven door is connected to the housing, so that the oven door, glass assembly, and housing define an interior oven cavity. The first glass pane can be on a side of the glass assembly that faces either the interior oven cavity or the exterior of the oven.

The present disclosure also provides methods of making glass assemblies comprising the steps of preparing a mold having a cavity that conforms to a shape of the frame, placing the first glass pane in the mold, melting and injecting a frame material into the mold and around the first glass pane, and cooling the frame material, so that the first glass pane is encapsulated therein.

DETAILED DESCRIPTION OF THE DISCLOSURE

Figure 1:
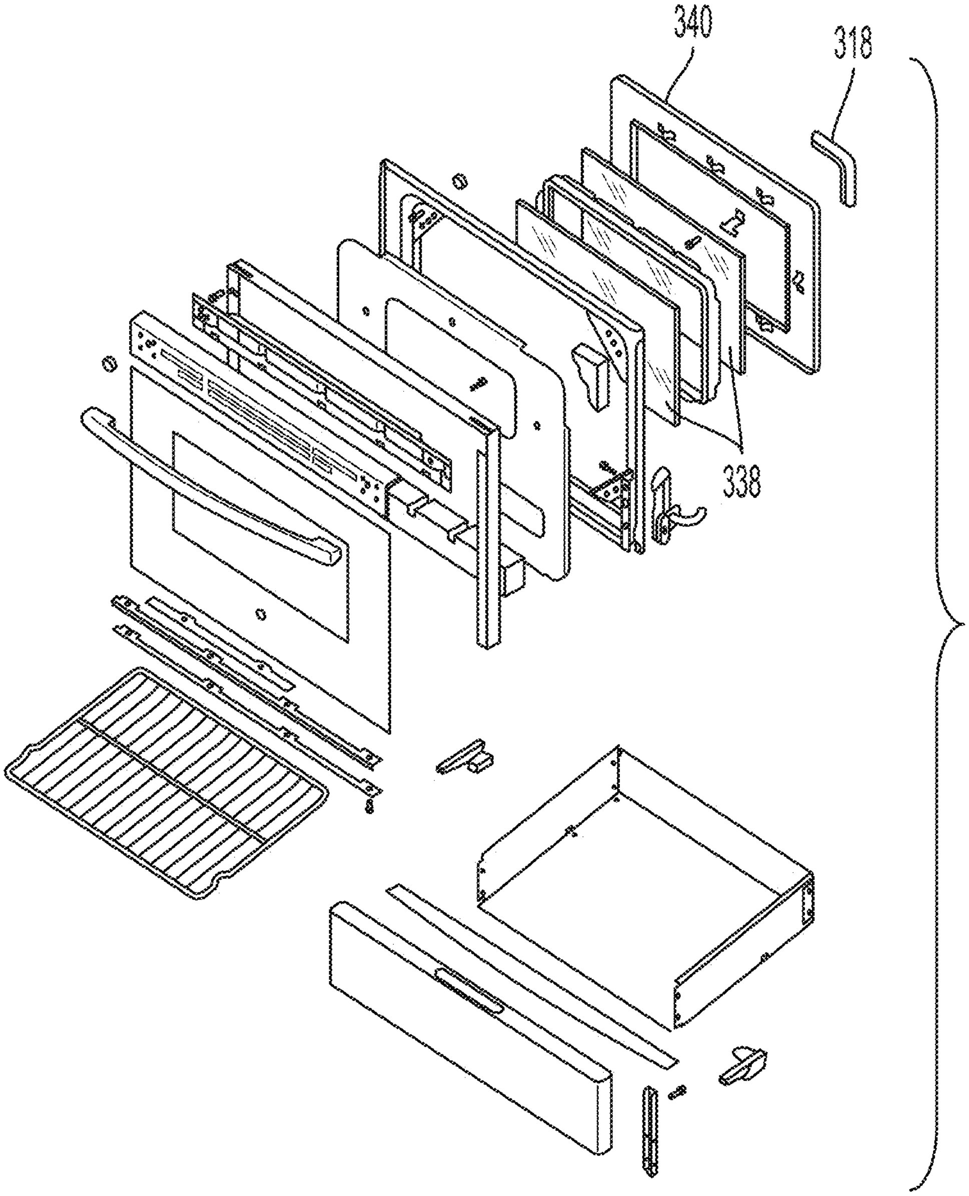
FIG. 1 (Prior Art)
FIG. 1 is an exploded view of an oven door assembly according to the prior art.
Figure 2:
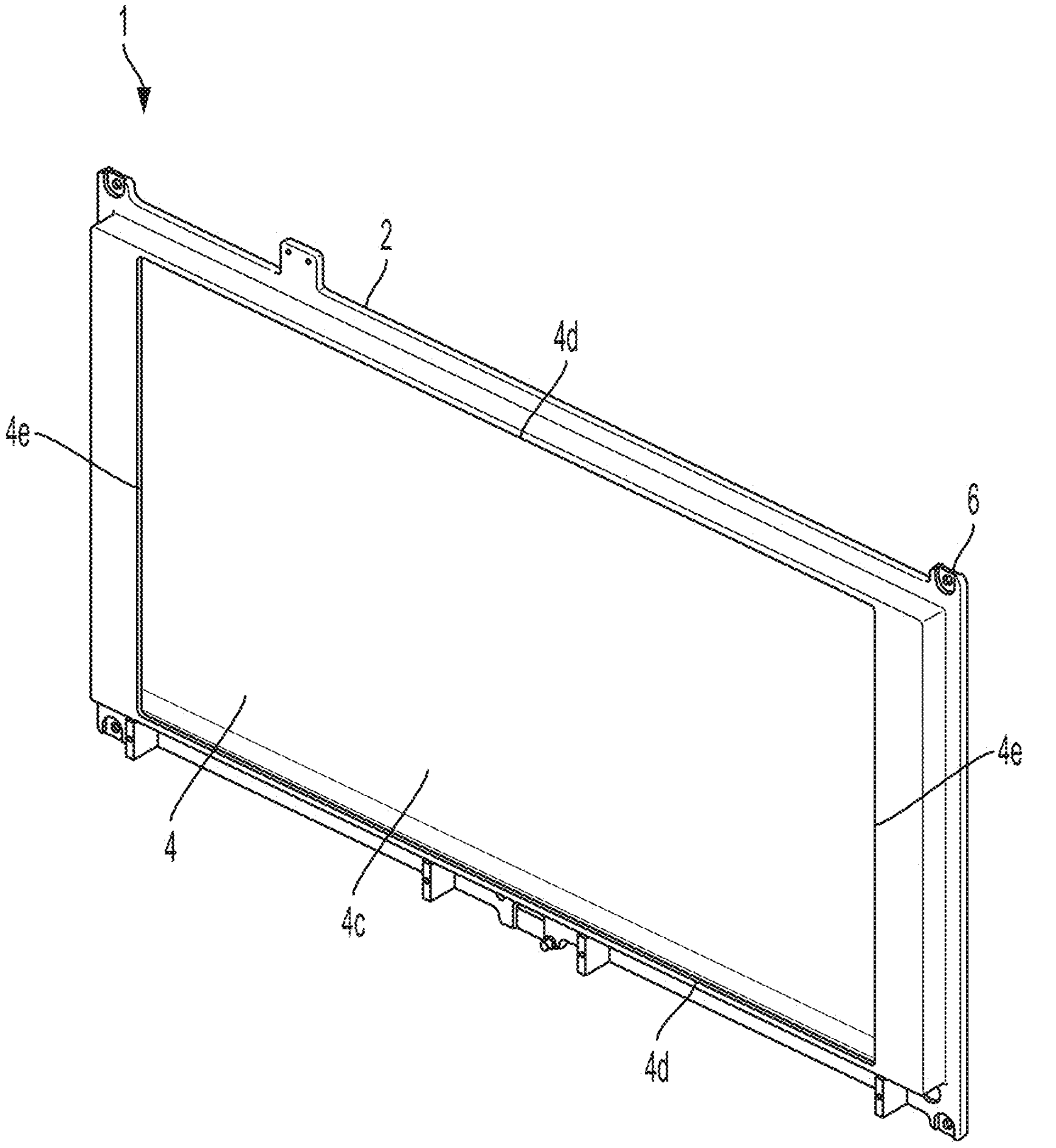
FIG. 2 is a top, perspective view of an oven door including an assembly of the present disclosure.

Referring to the drawings, and in particular FIGS. 2-5, assembly 1 of the present disclosure is shown. Assembly 1 includes a frame 2, an inner glass pane 3, and an outer glass pane 4. When assembly 1 is used in an oven door, inner glass pane 3 faces the interior of the oven cavity, and outer glass pane 4 faces the outside environment. Inner glass pane 3 and outer glass pane 4 are in substantially parallel spaced arrangement, so that an interior space 5 is defined by frame 2 and the two glass panes 3, 4. At least one of inner glass pane 3 and outer pane 4 is encapsulated within frame 2. In the embodiment of FIGS. 2-5, outer glass pane 4 is encapsulated within frame 2, and inner glass pane 3 is not encapsulated and is instead adhered or connected to frame 2. As will be described in greater detail below, inner glass pane 3 can be encapsulated within frame 2 instead of having outer glass pane 4 encapsulated within frame 2, or each of panes 3 and 4 can be encapsulated within frame 2. Assembly 1 can be connected to an oven door 10.

Assembly 1 provides several significant advantages over currently available assemblies. The material used for frame 2 can be plastic, which means that it can be lighter than metal and does not experience the heat conduction prevalent in current metal assemblies. While encapsulation by injection molding can be a complicated process, assembly 1 can eliminate the need for multi-component oven doors. Many if not all current assemblies use components such as gaskets to prevent air, heat, or moisture leakage, but these components can fail. Currently available assemblies also have seals between the panes and surrounding the entire perimeter of the edges of the panes. The assemblies of the present disclosure are not required to have seals between panes and do not require desiccants, spacers, or vapor seals.

The encapsulation, along with the fact that in several embodiments only one pane is encapsulated, means that assembly 1 is not necessarily completely airtight. This can be an advantage, because it allows for the pressure in interior space 5 to equalize with ambient pressures. When assembly 1 is used at high altitudes, or at the high temperatures common to ovens, there may be a temporary pressure imbalance across assembly 1, in particular between interior space 5 and the ambient environment. Assembly 1 is designed so that heat and moisture transfer are significantly reduced, but enough air can migrate through assembly 1 to allow for pressure imbalances to resolve. Current units may fail under these pressure imbalance situations. In addition, since frame 2 can be made of the same single material, assembly 1 can eliminate concerns with thermal expansion mismatches that can cause sealing problems in current assemblies, for example at junctions between materials of different types.

In the present disclosure, the glass panes of the assemblies each have two faces, and also each have an edge that runs around the perimeter of each pane. The edges have a dimension that corresponds to the thickness of the pane. When each pane is a rectangular solid, each glass pane will have two faces and four edge segments. Two of the edge segments may be longer, i.e. the lengths, and two may be shorter, i.e. the widths. The perimeter of the glass pane is the continuous path along the lengths and widths of the pane. Thus, for assembly 1, as shown in FIGS. 2-5, each of panes 3 and 4 have edges **3*a* and 4*a*, respectively. They also have faces 3*b*, 3*c*, 4*b*, and 4*c*, respectively. Each of panes 3 and 4 also have length segments and width segments. The perimeter of pane 4 would therefore be the sum of twice length segment 4*d* and twice width segment 4*e*. The present disclosure contemplates that assembly 1 can use panes with different shapes than rectangles, for example squares (where the lengths and widths of the pane are equal), triangles, or other polygonal shapes, and circles, ovals, or ellipses. The perimeter of these different shapes is the sum of all sides of a polygon, or the circumference of the rounded shapes. Similar features can be found in assemblies 101 and 201**, which are described below.

By "encapsulated", "encapsulating", and "encapsulation" the present disclosure refers to a structure and process where a material is molded, for example using an injection molding process, around a part so that the material and part become integral and cannot be separated without damaging one or both. In an encapsulation process, the material that is molded around the part is hot when it is applied, and then shrinks as it cools to grip or attach to the part tightly. With reference to the glass pane 4 in FIG. 4, the frame 2 contacts pane 4 on three surfaces, namely edge **4*a* and faces 4*b* and 4*c*, to form a U-shaped encapsulation in cross-section. In the present disclosure, the material for frame 2 can encapsulate edge 4*a*, and a portion of faces 4*b* and/or 4*c***.

When panes 3 and/or 4 are encapsulated by frame 2, the material of frame 2 is along the entire perimeter, or along all four sides of the pane 3 or 4. This is known as "four-side encapsulation". If there is any break in the encapsulation around the perimeter sides of the pane, assembly 1 may lose its effectiveness as a barrier against heat or water migration. As previously discussed, the encapsulation is not necessarily air-tight, so that air may travel from interior space 5 to the ambient environment, to equalize any pressure gradients therebetween. Encapsulation is distinguished from a scenario where a glass pane is adhered to a plastic frame (with an adhesive or the like) that has already been separately formed.

The present disclosure also contemplates an embodiment where there is only encapsulation on two sides of the pane 3 or 4, in what would be known as "two-side encapsulation". In this embodiment, the non-encapsulated sides may need to be sealed off in some way to prevent heat migration out of the assembly. The same is true where panes 3 and 4 are not rectangular solids—i.e., the encapsulation may only be one two of the sides of the pane, or on part of the circumference.

In encapsulation, how the frame 2 and the glass pane(s) 3 and/or 4 are secured depends on the design of each, the type of frame material used, and the encapsulation process. During the encapsulation process, as discussed in greater detail below, molten frame material is injected around the glass pane. As the molten frame material cools, it contracts and squeezes the glass pane tightly. In encapsulation, there are usually no adhesives, chemicals or any other substances that hold the pane and frame together.

As described above, in the shown embodiments the encapsulation is such that the material for frame 2 contacts an edge and two faces so that the encapsulation is U-shaped in cross-section. In some applications, the frame material might only cover the edges of a pane and a portion of only one face of the pane. There would be no frame material on the other face of the pane, so that the frame material will be flush with the non-encapsulated face. In these embodiments, as the plastic shrinks, it can detach from the glass since the encapsulating material does not touch both faces of the pane. Primers, adhesive compounds, or bonding agents can be used to adhere the frame material and pane together in two-sided encapsulation. It may also be possible to use a frame material that does not shrink as much, and is thus less likely to detach. In another embodiment, the frame material is set only along the edge of the pane and not on either face. Here, the frame material is flush to both faces of the pane. This embodiment can also require the use of primers, adhesives, or bonding agents.

Figure 3:
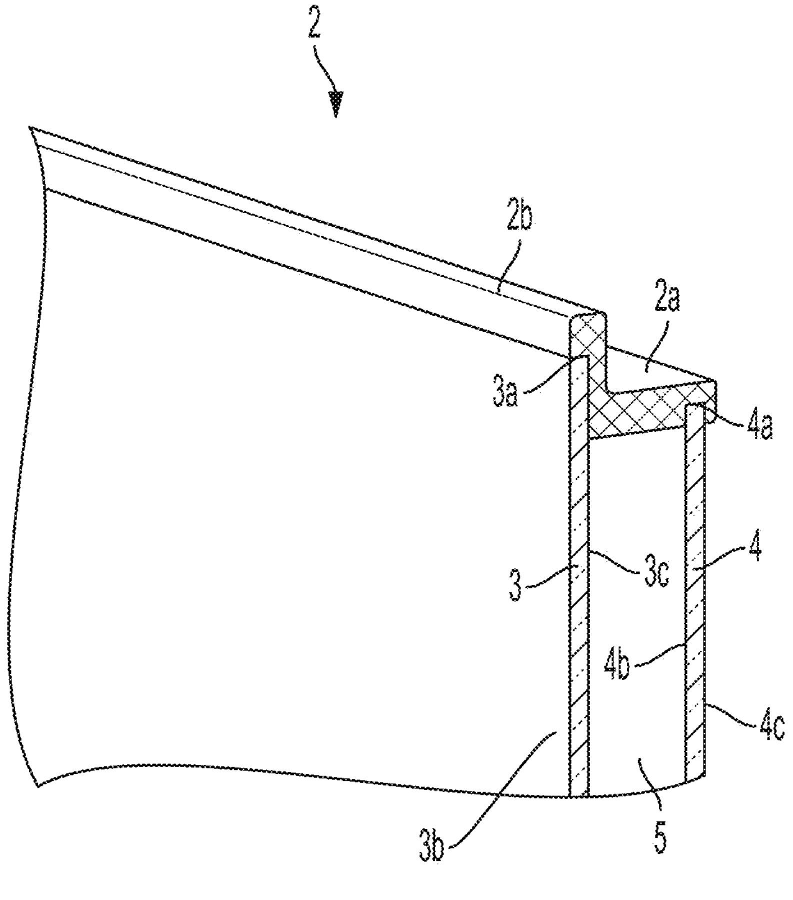
FIG. 3 is a detail view of an assembly of the present disclosure.
Figure 4:
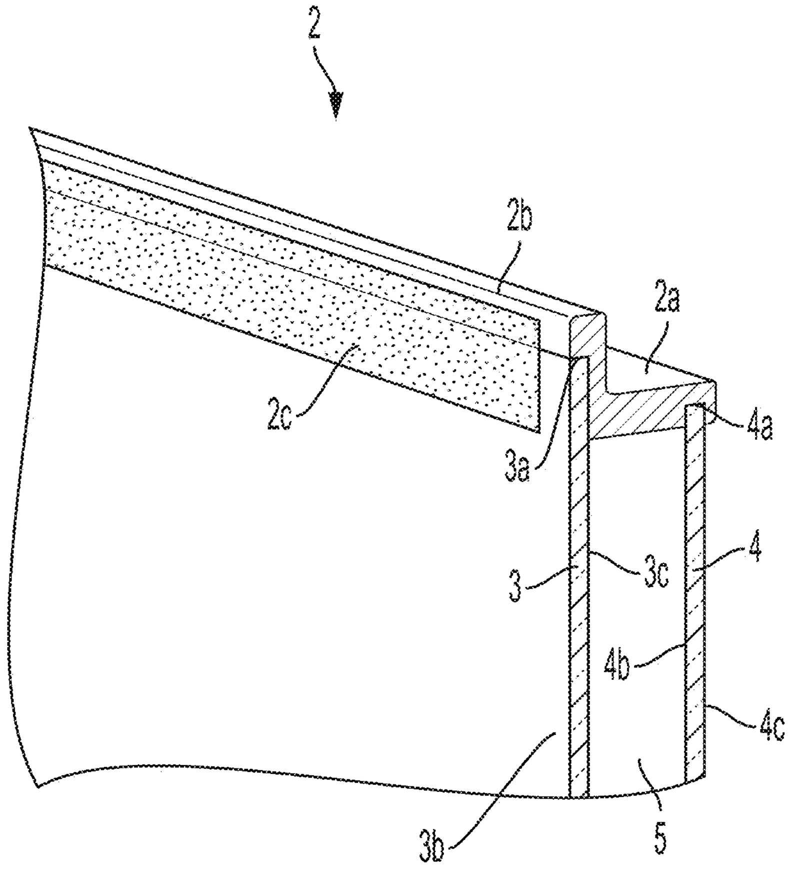
FIG. 4 is a second detail view of an assembly of the present disclosure, showing an area where an adhesive can be applied.

Referring specifically to FIGS. 3 and 4, frame 2 has a horizontal flange 2*a* and a vertical flange 2*b*. On vertical flange 2*b*, for example on a surface of vertical flange 2*b* that is coplanar with face 3*b* of pane 3, there can be a sealant area 2*c*. An adhesive or other sealant can be applied to this area 2*c* so that inner glass pane 3 can be adhered or sealed to frame 2 or to the oven door 10. The adhesive or seal shown and described in FIGS. 3 and 4 next to non-encapsulated pane 3 is in a different location than conventional seals, which are on the perimeter edges. Conventional seals on the exterior are usually around the perimeter parallel to or adjacent to the edges of the pane. Again, the present assemblies provide a much more efficient design.

The seal formed between inner glass pane 3 and frame 2 or oven door 10 in area 2*c* can be air-tight, to prevent heated air from leaking out of the oven cavity. As shown, since inner glass pane 3 is sealed at area 2*c*, the sealant is not visible from the exterior side of assembly 1. In addition, either of flanges 2*a* and 2*b* can be used as mounting locations for other components, such as lights (not shown).

Figure 5:
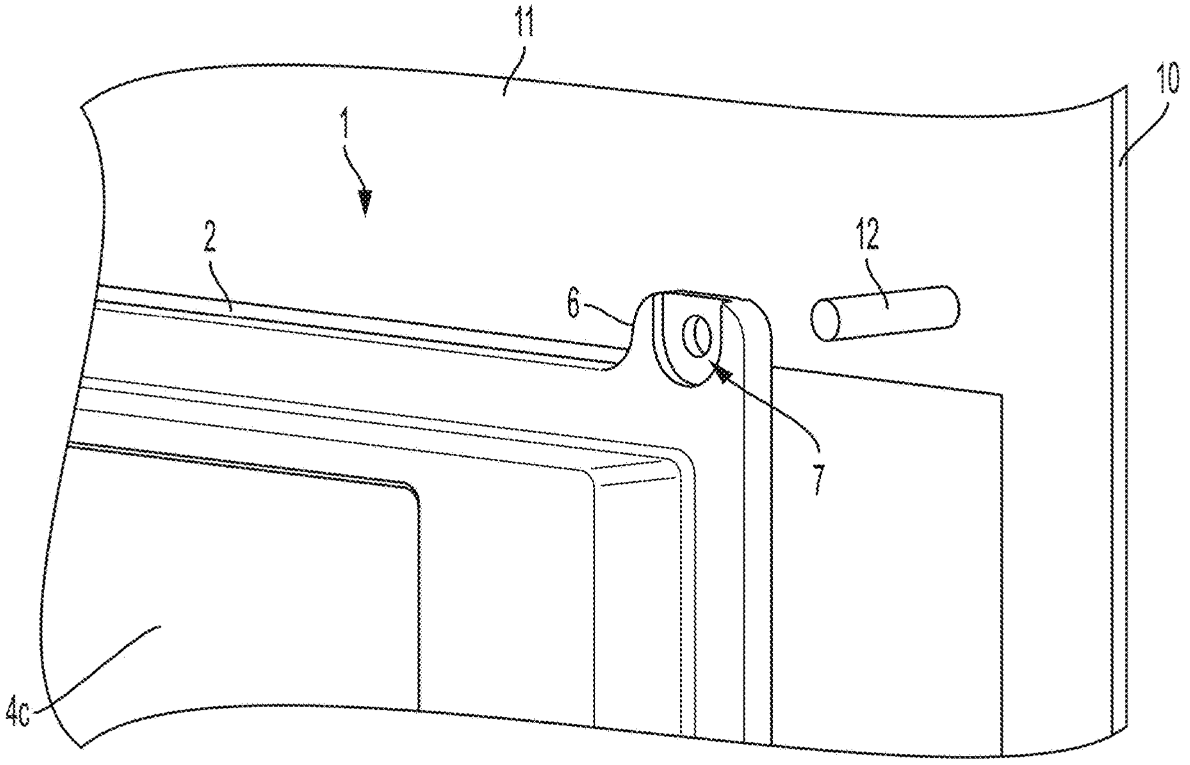
FIG. 5 is a detail view showing how an assembly of the present disclosure can be connected to an oven door.

As shown in FIG. 5, assembly 1 can be connected to oven door 10. Assembly 1 can have a mounting tab 6 that is connected to or an integral part of frame 2. Mounting tab 6 can have a hole 7 therethrough. Oven door 10 can have a surface 11, with a bolt 12 projecting therefrom. Assembly 1 can be connected to door 10 by passing bolt 12 through hole 7. The present disclosure contemplates other ways for mounting assembly 1 to oven door 10, such as with other fasteners or adhesives. Oven door 10 with assembly 1 connected thereto is then connected to the remainder of the oven (See FIG. 10, discussed below) to insulate the interior cavity of the oven.

Figure 6:
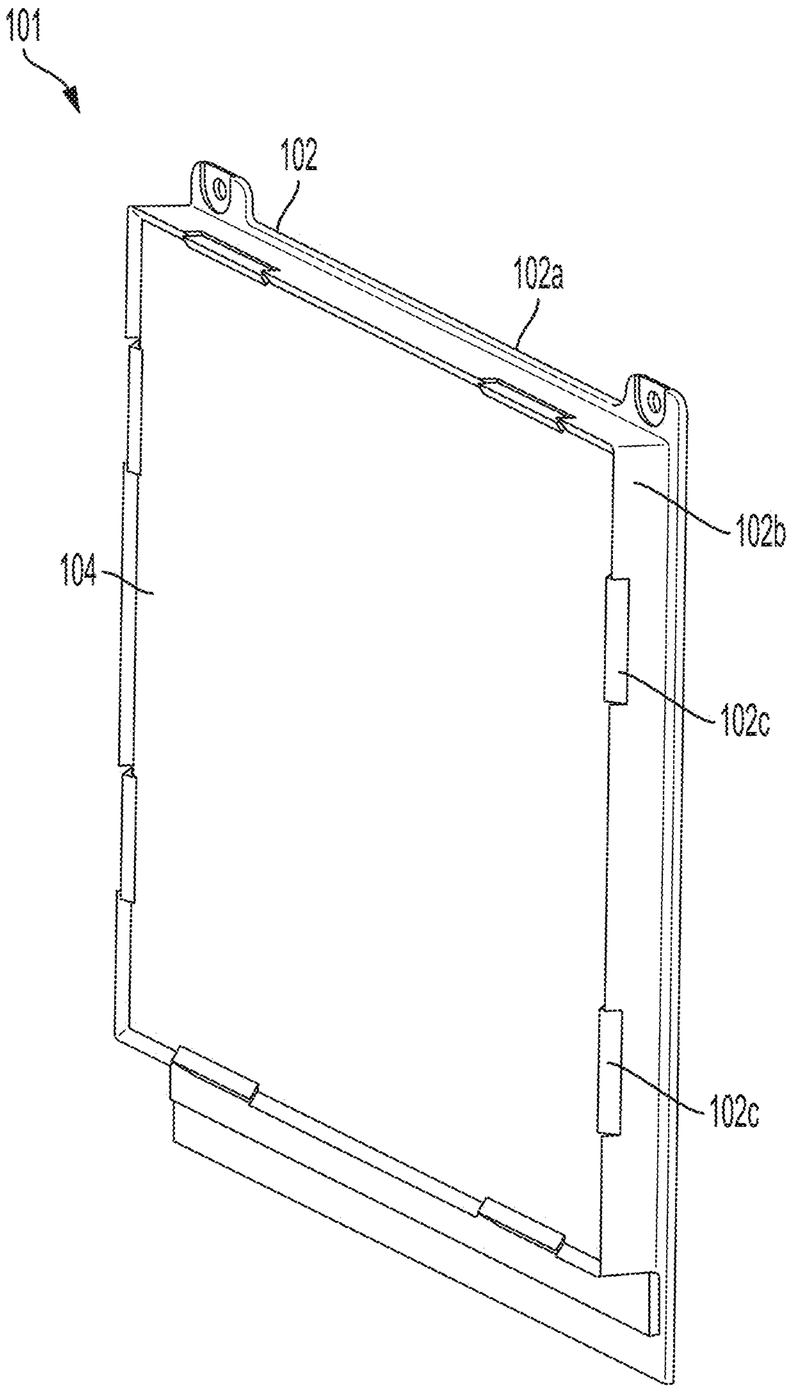
FIG. 6 is a top, perspective view of a second embodiment of the assembly of the present disclosure.
Figure 7:
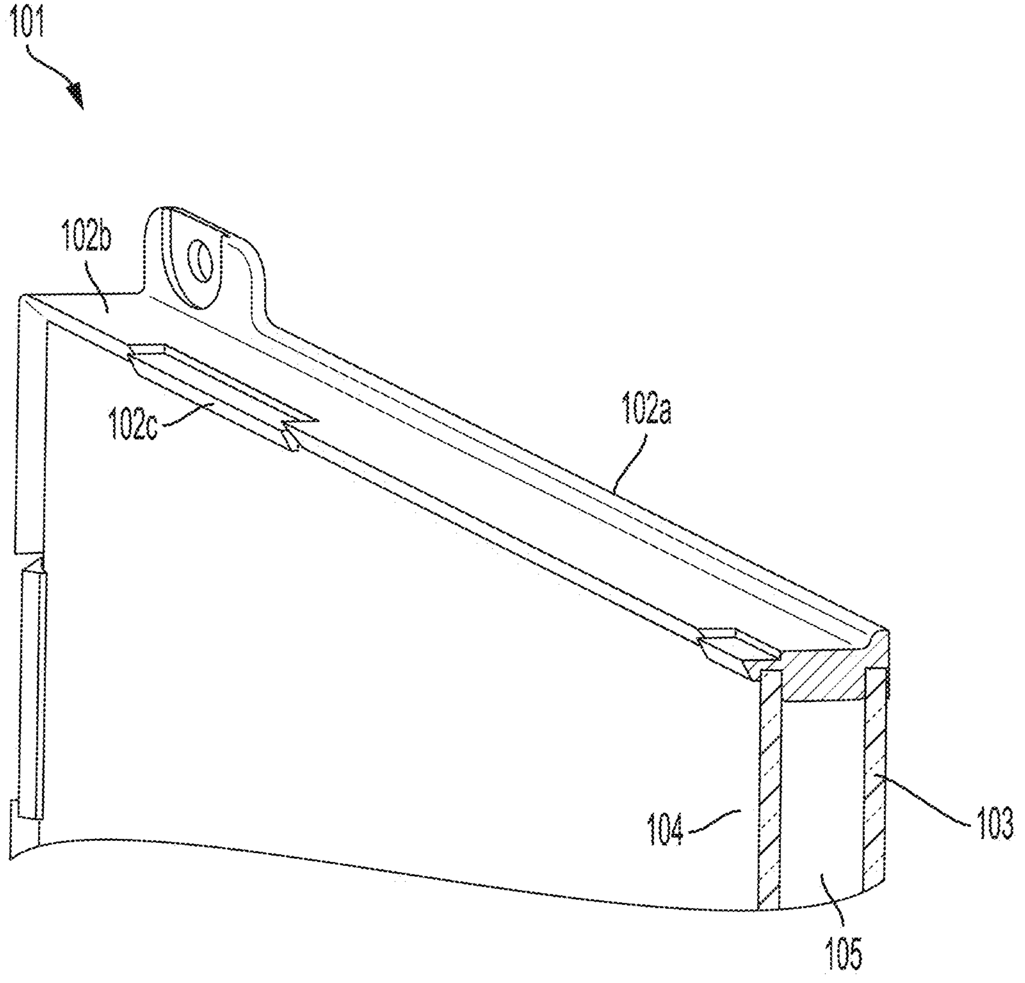
FIG. 7 is a detail view of the assembly of FIG. 6.

Referring to FIGS. 6 and 7, a second embodiment of assembly 101 of the present disclosure is shown. Assembly 101 has frame 102 (with vertical flange 102*a* and horizontal flange 102*b*), inner glass pane 103, and outer glass pane 104. Assembly 101 is similar to assembly 1, with the exception that in assembly 101, the inner glass pane 103 is encapsulated by frame 102 and the outer glass pane 104 is not encapsulated. Outer glass pane 104 is connected to frame 102 via a plurality of snap-in mechanisms or cantilevers 102*c* that are situated on the horizontal flange 102*b* around the perimeter of outer glass pane 104. To connect outer glass pane 104 to frame 102, a user simply snaps pane 104 using the snap-in mechanisms 102*c*. An interior space 105 is thus defined by frame 102, inner glass pane 103, and outer glass pane 104. An adhesive (not shown) may be used. The encapsulation in assembly 101 can provide similar benefits as that of assembly 1, namely to prevent heat and moisture migration from inside of an oven cavity to the exterior ambient environment. Since outer glass pane 104 is snapped in, it may not provide as much heat, moisture, or air migration as outer pane 4 in assembly 1, but it has the advantage of potentially being easier to assemble or disassemble.

Figure 8:
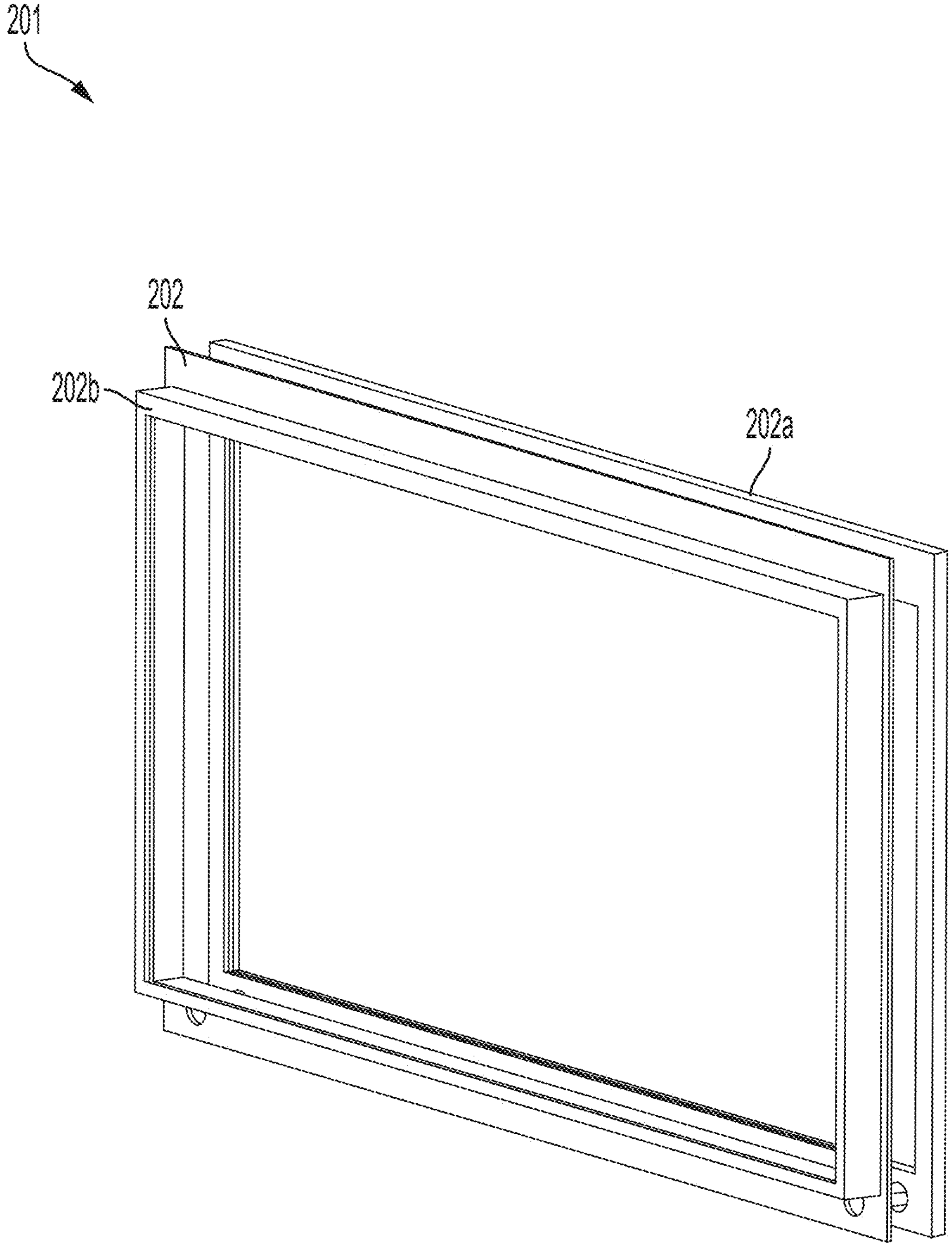
FIG. 8 is a top, perspective view of a third embodiment of the assembly of the present disclosure.
Figure 9:
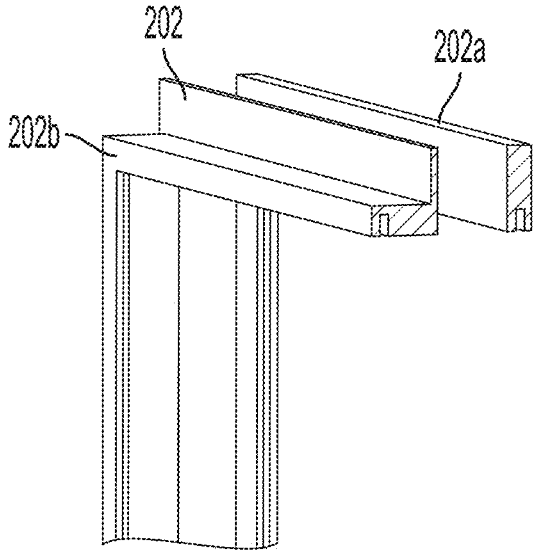
FIG. 9 is a cross-sectional view of the assembly of FIG. 8.

Referring to FIGS. 8 and 9, a third embodiment of the assembly of the present disclosure is shown, by reference number 201. Assembly 201 has frame 202, which comprises two separate components, namely first frame 202*a* and second frame 202*b*. Assembly 201 is shown without an inner glass pane and an outer glass pane, but at least one of each pane would be encapsulated within first frame 202*a* or second frame 202*b* in a similar manner to prior embodiments. First frame 202*a* and second frame 202*b* are connected to or adhered to one another to form a single combined frame. First frame 202*a* and second frame 202*b* can be connected to one another with glue, adhesive, fastener, interlock, snap, heat stake, vibration welding, and combinations thereof, as non-limiting examples.

Figure 10:
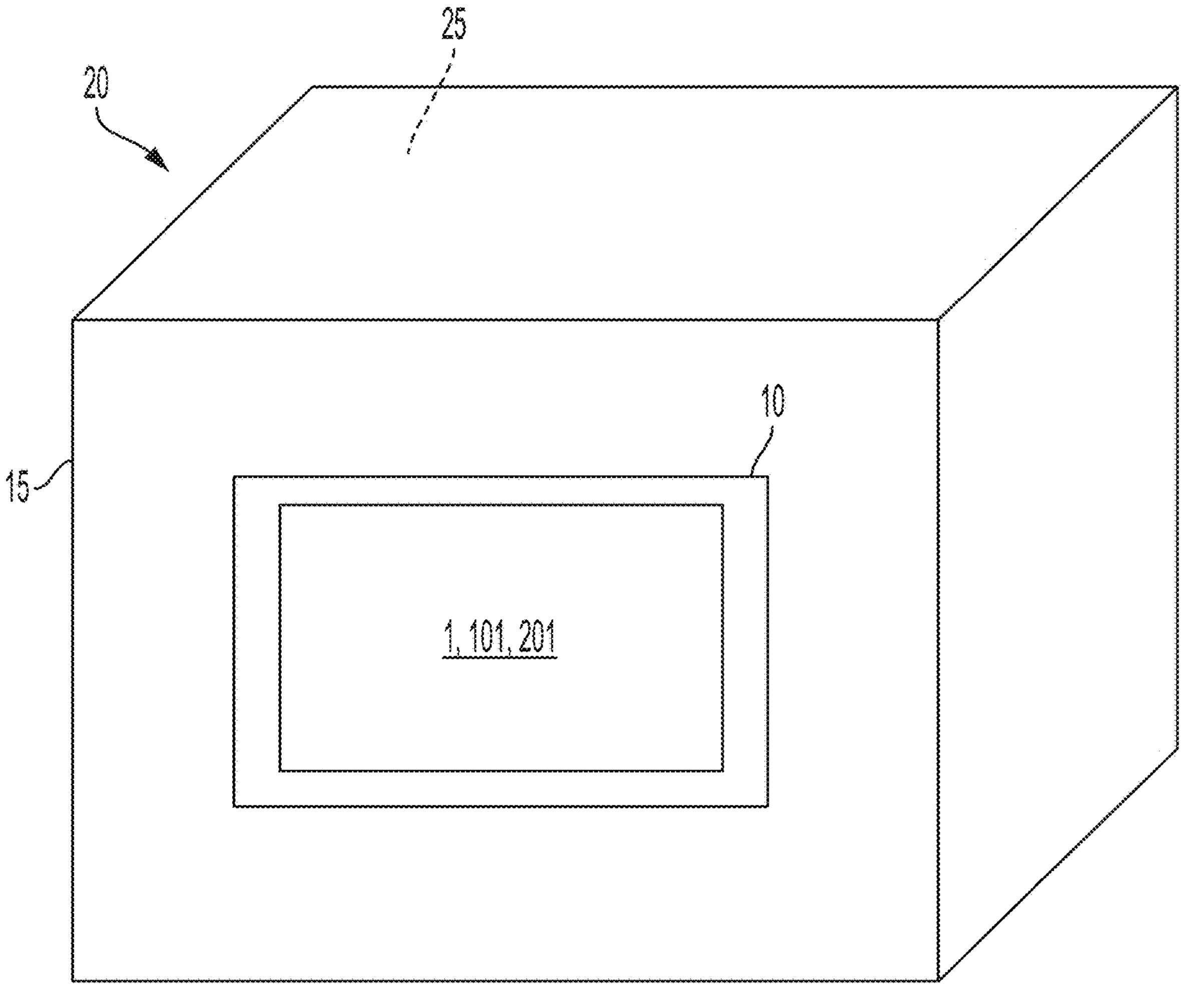
FIG. 10 is a schematic drawing of an oven including a glass assembly of the present disclosure.

Referring to FIG. 10, an oven 20 of the present disclosure is shown. Oven 20 has oven door 10 and housing 15. Housing 15 is the exterior shell of oven 20. For example, in an oven that is a cube or rectangular solid, the housing 15 would include five of the six sides of the solid, and part of or all of the front face. Door 10 would be on or comprise the entire front face. Door 10 and housing 15 define an interior cavity 25 where products are heated, for example food products. As described above, assemblies 1, 101, and 201 of the present disclosure are connected to oven door 10, which is in turn connected to housing 15.

To make any of the assemblies of the present disclosure, the skilled artisan can use any known encapsulation processes. For example, a steel mold is made in the desired shape. The glass pane to be encapsulated is placed in the mold. The material for the frame (2, 102, 202) is injected into the mold in molten form. Since the other of the glass panes in the assembly is not present in the mold, a shaper or barrier can be placed in the mold to make sure the molten frame material makes the desired shape. The material is cooled, and the shaper or barrier is removed. The second glass pane is then adhered to the completed injection molded frame, as in assembly 1, or snapped in, as in assembly 101. For assembly 201, the encapsulation process is performed for each pane, and then as described below the two separate frames are connected to one another.

The material for the frames of the present disclosure should be one that can survive very high temperatures, such as those used in residential ovens that operate up to 1,000 degrees Fahrenheit, such as pyrolytic ovens that operate up to 900 degrees Fahrenheit, bake ovens that operate up to 600 degrees Fahrenheit, and steam ovens that operate up to 500 degrees Fahrenheit. At the same time, the material must be workable enough to form the frame via encapsulation. Important factors in the choice of material are flow, elasticity, shrink, impact resistance, and temperature resistance. The material should be durable enough so that it does not deform, lose its rigidity, or melt at temperatures of up to 500 degrees Fahrenheit at least. That is, the frames of the assemblies of the present disclosure should maintain their structural integrity and not degrade after the material is cooled and encapsulates the glass panes in the manner described above, to temperatures of at least 500 degrees Fahrenheit. Suitable materials include, but are not limited to, nylon polymers or polypropylene.

The glasses used in the present disclosure can be any suitable for use in ovens, such as soda lime, coated soda lime, glass-ceramics, or Borofloat® glass from Schott. The glasses can be coated and/or functionalized on one or both sides. For example they can be heated glass, lighted glass or electro-chromic glass (switchable glass) or can have a transparent conducting oxide (TCO) layer or layers, a low emissivity layer, a hydrophobic layer, and/or an anti-fog layer. All of these are possible as long as the encapsulation on the panes is not breached.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. An assembly comprising:

a plastic frame extending at least partially around a perimeter of the assembly, the plastic frame having an L-shaped cross-sectional shape with a forwardly extending first leg having a first, inner surface and an outwardly extending second leg having a second, rear surface, the first and second surfaces being adjacent and transverse to one another to form a corner between the first and second legs;

a first glass pane; and a second glass pane that extends outwardly of the first leg, wherein the first glass pane and the second glass pane are in substantially parallel, spaced arrangement, wherein the first glass pane is encapsulated by the frame in the first leg through the first surface;

wherein the second glass pane extends along the second surface of the second leg outwardly of the corner and is not encapsulated by the frame.

2. The assembly of claim 1, wherein the first glass pane has a perimeter, and wherein the first glass pane is encapsulated by the plastic frame around the perimeter.

3. The assembly of claim 2, wherein the first glass pane is a rectangular solid having four sides that make up the perimeter.

4. The assembly of claim 1, wherein the second leg of the plastic frame comprises a vertical leg and the first leg of the plastic frame comprises a horizontal leg.

5. The assembly of claim 4, wherein the first glass pane is encapsulated by the horizontal leg and wherein the second glass pane is not encapsulated.

6. The assembly of claim 4, wherein the second glass pane is connected to the vertical leg.

7. The assembly of claim 1, wherein the second glass pane is connected to the plastic frame in an air-tight manner.

8. The assembly of claim 6, wherein the second glass pane is connected to the vertical leg with an adhesive.

9. The assembly of claim 6, wherein the second glass pane is connected to the vertical leg with a plurality of snap-in mechanisms.

10. The assembly of claim 1, wherein the frame is made of a material that does not degrade at 500 degrees Fahrenheit.

11. The assembly of claim 1, wherein, between the first glass pane and the second glass pane, there is no spacer.

12. The assembly of claim 1, further comprising a transparent conducting oxide (TCO) layer, a low emissivity layer, a hydrophobic layer, and/or an anti-fog layer that is provided on one or more of the first glass pane and the second glass pane.

13. The assembly of claim 1, wherein the plastic frame comprises a first frame half and a second frame half that are separately formed components;

the first glass pane is encapsulated by the first frame half, and the first frame half and the second frame half are connected to one another.

14. An oven comprising:

the assembly of claim 1;

an oven door, wherein the assembly is connected to the oven door; and a housing, wherein the oven door is connected to the housing so that the oven door, the assembly, and the housing define an interior oven cavity, wherein the first glass pane is on a side of the assembly that faces away from the interior oven cavity.

15. The assembly of claim 1, wherein the plastic frame is a single-piece frame.

16. The assembly of claim 1, wherein the assembly does not include desiccants, spacers, or vapor seals.

17. The assembly of claim 1, wherein the first surface extends between the first and second glass panes in a direction transverse to planes of the first and second glass panes.

18. A method of making the assembly of claim 1, comprising the steps of:

preparing a mold having a cavity that conforms to a shape of the plastic frame;

placing the first glass pane in the mold;

injecting frame material into the cavity and around the first glass pane; and cooling the frame material so that the first glass pane is encapsulated by the frame material.

19. The method of claim 18, further comprising, after the placing the first glass pane step, the step of:

placing a barrier in the mold on top of the first glass pane so that the barrier prevents the migration of the melted frame material on the first glass frame beyond a desired point.

* * * * *